(12) United States Patent
Grote et al.

(10) Patent No.: US 12,320,461 B2
(45) Date of Patent: Jun. 3, 2025

(54) STOP AND GO PIG

(71) Applicant: ROSEN SWISS AG, Stans (CH)

(72) Inventors: Matthias Grote, Lingen (DE); Ingo Nee, Dorpen (DE)

(73) Assignee: Rosen IP AG, Stans (CH)

( * ) Notice: Subject to any disclaimer, the term of this patent is extended or adjusted under 35 U.S.C. 154(b) by 764 days.

(21) Appl. No.: 17/613,329

(22) PCT Filed: May 20, 2020

(86) PCT No.: PCT/EP2020/064203
§ 371 (c)(1),
(2) Date: Nov. 22, 2021

(87) PCT Pub. No.: WO2020/234420
PCT Pub. Date: Nov. 26, 2020

(65) Prior Publication Data
US 2022/0213999 A1 Jul. 7, 2022

(30) Foreign Application Priority Data
May 20, 2019 (DE) .................... 10 2019 113 385.8

(51) Int. Cl.
*F16L 55/32* (2006.01)
*B08B 9/055* (2006.01)
(Continued)

(52) U.S. Cl.
CPC .............. *F16L 55/32* (2013.01); *B08B 9/055* (2013.01); *F03B 13/00* (2013.01); *F03B 17/065* (2013.01);
(Continued)

(58) Field of Classification Search
CPC ....... F16L 55/32; F16L 55/38; F16L 2101/12; F16L 2101/30; B08B 2209/0053;
(Continued)

(56) References Cited

U.S. PATENT DOCUMENTS 4,055,315 A * 10/1977 Gvelesiani .............. F16L 55/38
104/168
2002/0190682 A1* 12/2002 Schempf .............. G01N 29/265
318/568.11
(Continued)

FOREIGN PATENT DOCUMENTS

CN 109058650 A 12/2018
EP 1171733 A1 1/2002

*Primary Examiner* — Andrew A Horton
(74) *Attorney, Agent, or Firm* — Husch Blackwell LLP

(57) ABSTRACT

A pig is provided for use in pipelines filled with a flowing fluid. The pig includes a pig body, a drive element which may be a propeller disposed on said pig body which can be rotated by the flowing fluid. The pig also includes a generator unit connected to the drive element through which a movement of the drive element may be converted into electrical energy, and a locking means through which the position and/or the speed of the pig inside the pipeline may be fixed. The generator unit is designed to operate as a motor through which the drive element may be made to rotate and which is designed to set a speed for the pig that is different from the flow velocity of the flowing fluid inside the pipeline and that the pig is provided with an energy storage unit for electrical energy, which is connected to the generator unit.

19 Claims, 5 Drawing Sheets

(51) Int. Cl.
  *F03B 13/00* (2006.01)
  *F03B 17/06* (2006.01)
  *F16L 55/38* (2006.01)
  *F16L 101/12* (2006.01)
  *F16L 101/30* (2006.01)
  *G01N 23/223* (2006.01)

(52) U.S. Cl.
  CPC ....... *F16L 55/38* (2013.01); *B08B 2209/0553* (2013.01); *F05B 2220/20* (2013.01); *F05B 2260/42* (2013.01); *F16L 2101/12* (2013.01); *F16L 2101/30* (2013.01); *G01N 23/223* (2013.01)

(58) Field of Classification Search
  CPC . B08B 2209/0553; B08B 9/055; F03B 13/00; F03B 17/065; F05B 2220/20; F05B 2260/42; G01N 23/223
  See application file for complete search history.

(56) References Cited

U.S. PATENT DOCUMENTS

| | | | |
|---|---|---|---|
| 2003/0029256 A1* | 2/2003 | Savard | F16L 55/38 73/865.8 |
| 2015/0252684 A1* | 9/2015 | Minola | F03D 1/04 290/52 |
| 2018/0036778 A1* | 2/2018 | Punpruk | F16L 55/28 |

* cited by examiner

STOP AND GO PIG

CROSS REFERENCE

This application claims priority to PCT Application No. PCT/EP2020/064203, filed May 20, 2020, which itself claims priority to German Patent Application No. 10 2019 113385.8, filed May 20, 2019, the entirety of both of which are hereby incorporated by reference.

FIELD OF THE INVENTION

The present invention relates to a pig that is able to operate inside a pipeline filled with flowing fluid, comprising a pig body, a drive element, preferably a propeller, disposed on the pig body that may be made to rotate by the flowing fluid, a generator unit that is connected to the drive element, by means of which it is possible to convert a movement of the drive element into electrical energy, and a locking means through which the position and/or the speed of the pig inside the pipeline may be fixed.

BACKGROUND OF THE INVENTION

Pigs of this kind are used, for example, as inspection pigs or cleaning pigs for checking or cleaning pipelines, whereby the pipelines are pipelines for the transportation of natural gas, crude oil or crude oil products, water or such like. In the simplest of instances, such pigs are moved through the pipeline by the fluid flowing through the pipeline. To this end the pigs are typically provided with a plurality of sealing elements, for example deformable disks made from an elastomer such as polyurethane. The sealing elements are in contact with the inner wall of the pipeline. The movement velocity of pigs of this kind is therefore dependent on the flow velocity of the fluid through the pipeline.

Different variants have been proposed with the aim to make the transportation of the pig through a pipeline less dependent on the flow velocity of the medium inside the pipeline.

The document EP 1 171 733 B1 shows, for example, a pig in which a turbine is made to rotate by the fluid flowing through the pipeline, where said rotation of the turbine is utilized to propel wheels that are in contact with the internal wall of the pipeline. The pig is moved inside the pipeline by said wheels.

SUMMARY OF THE INVENTION

It is the object of the present invention to develop a pig of this kind further.

The pig according to the invention is provided with a generator unit that is designed to operate as a motor. The generator unit, which is able to operate as a motor, is designed such that it is able to rotate the drive element, whereby the drive element is designed such that it may be used to set a speed for the pig that differs from the flow velocity of the fluid flowing through the pipeline. To this end the pig is provided with an energy storage unit for electrical energy that is connected to the generator unit. Said energy storage unit provides the energy required to rotate the drive element.

A pig according to the invention that is designed in this manner may, like an above-described simple pig, be at first transported passively by the fluid flow through the pipeline. The generator unit, which operates as a motor, is able to rotate the drive element, which reduces the speed of the pig relative to the pipeline wall, for example. A locking means is then able to fix the position of the pig inside the pipeline. Said locking means may, for example, be brought into contact with the internal wall of the pipeline. The locking means may be means that fix the pig relative to the pipeline wall, in other words they jam it inside the pipeline. Nevertheless, it may also be a means for propelling the pig precisely along the internal wall of the pipeline. A locking means of this kind may comprise, for example, wheels or tracks that may be driven, or at least slowed down. The speed of a pig in the pipeline may, for example, also be controlled by an eddy current brake or through sealing elements of the pig that are in contact with the pipeline, in particular via sealing elements the contact pressure of which is adjustable with respect to the pipeline wall.

A pig according to the invention may therefore initially be transported rapidly through the pipeline. Through the drive element, which may be made to rotate and which acts upon the fluid that flows through the pipeline, the pig may be slowed down relative to the wall of the pipeline without causing additional wear of the pipeline wall and/or a braking or locking means of the pig. In that sense the pig can be slowed down without wear. The pig may be stopped at a certain location in the pipeline or it may be driven past the pipeline wall at a defined speed by way of the locking means. This makes inspections of the pipeline more reliable. Pipeline inspection methods may be used that are not possible, or possible only at great expense, with commonly used pigs due to their long measuring times. It is furthermore feasible to utilize a pig of this kind for repair work inside a pipeline where it has to remain at a certain position in the pipeline for a prolonged period.

Work that is easily carried out by a pig that remains in one location inside the pipeline for a prolonged period, or work that only becomes possible through a pig of this kind, includes in particular the repair of damaged areas in particular through grinding out and sealing of cracks, through build-up welding, local 3D printing, application and curing or providing curing time for synthetic resins, or through application of patches of fiber-reinforced synthetic materials, local mechanical machining, in particular grinding a weld seam or the retrofitting of equipment in the pipeline such as sensors or valves. To this end the pig may be provided with tools such as a welder, a drill, a grinder, an applicator and/or a manipulator.

As soon as the pig is fixed relative to the pipeline via the locking means, that is, it is either stationary or it is moved past the pipeline at a certain speed, the generator unit can act as a generator since it is driven by the drive element. In this instance the drive element is driven by the fluid that flows inside the pipeline past the pig. The fluid flowing in the pipeline is able to flow past the outside of the body of the pig. Nevertheless, the pig may also be provided with a fluid flow bypass inside the pig body. In this instance the drive element is disposed in the bypass, or inside a fluid flow passing through the bypass, upstream or downstream of the pig. The fixed pig is therefore able to tap into the energy of the fluid flowing inside the pipeline so as to provide electrical energy for a measuring device and/or a repair facility, for example, which is disposed on the pig according to the invention.

The pig according to the invention is therefore provided with a drive element, which is on the one hand suitable to be driven by a generator unit that operates as a motor and to move the pig relative to a fluid flowing inside the pipeline, preferably to slow it down in the pipeline. On the other hand, the drive element is designed to be rotated by a fluid that flows past the pig when in a fixed state and to provide electrical energy for the electrical systems disposed on the pig via the generator unit that now operates as a generator. This is of particular interest for pigs that remain inside a pipeline for prolonged periods and/or are provided with at least one high power-consuming component such as an actuator and/or a high power-consuming sensor, for example a sensor for a X-ray fluorescence analysis or an arrangement to carry out an atomic emission spectroscopy (AES), in particular a laser-induced breakdown spectroscopy (LIBS). A corresponding drive element that may be rotated is preferably provided in form of an adjustable propeller. This is a propeller in which the angle of attack of the individual propeller blades is variable. The angle of attack of the propeller blades may be adapted to different operating modes, in this instance therefore in particular to the operation as drive for the pig and to the operation as drive for the generator.

The pig is also provided with the components necessary for its operation, such as for example the control electronics for controlling the electrical and/or electronic components. The pig may also be provided with a data storage unit for the at least temporary storage of data of a sensor as well as means for the transmission and/or exchange of data. The pig may also be provided with an evaluation unit for the evaluation of sensor data. These means include the usual components of an electronic data processing unit such as a memory and a central processing unit.

The body of the pig is preferably designed such that the cross-sectional areas extending transverse to a longitudinal center axis of the pig body are smaller at the respective ends of the pig body than at least one cross-sectional area in a section of the pig body located between the ends. As a result of the change in cross-sectional areas of the pig body along its longitudinal extension the pig body acquires a streamlined shape. Each of the ends of the pig body is narrower than the center of the pig body. It is particularly preferred if the pig body is designed to be rotationally symmetrical, in particular drop-shaped. This results in a particularly streamlined design, which provides the least possible interruption to the fluid flowing in the pipeline. The forces acting upon the pig, which have to be absorbed by the locking means and are transferred into the pipeline wall, are therefore reduced.

The drive element is preferably disposed outside the pig body at one end of the pig body in such a way that it can be made to rotate through the fluid flowing past the outside of the pig body. This permits the drive element to be constructed larger than if it were disposed inside the pig body itself. This design also makes more space available for, for example, the energy storage unit and the generator unit and/or the pig body may be made smaller or narrower, which means that the fluid flowing in the pipeline is less interrupted and the forces acting upon the pig are reduced.

The pig is preferably provided with a second drive element that can be made to rotate, whereby the first and the second drive elements are designed to turn in opposite directions. By using two counter-rotating drive elements, the torsional moments acting upon the pig due to the respective drive elements can be compensated for. Through a skillful selection of the drive elements or their speeds respectively, the torsional moments transmitted by the drive elements cancel themselves out entirely. The spatial orientation of the pig inside the pipeline remains constant. Nevertheless, at least the forces acting upon the locking means are reduced, which occasionally has to transfer arising torsional moments into the pipeline wall. The two drive elements may be disposed beside each other, coaxially distanced from each other or immediately one after the other.

Particularly preferred is a design where the pig is provided with a counter-rotating twin propeller. A counter-rotating twin propeller of this kind is provided with a first and a second drive element, which rotate in opposite directions in operation. The opposite rotating direction is typically achieved by using epicyclic gearing, which provides automatic compensation for the torsional moments applied by the respective drive element onto the pig. A twin propeller of this kind may be driven by a generator unit that operates in motor mode. A twin propeller of this kind therefore permits a torque-free operation of the pig. The drive elements that may be made to rotate are preferably designed as adjustable propellers. The angle of attack of the propeller blades may be adjusted on each of the two drive elements, and the angle of attack of the propeller blades may be adapted in particular for the operating mode as drive for the pig and for the operating mode as drive for the generator.

The drive element is preferably covered by a shroud element. A shroud element of this kind protects the drive element from being damaged during transportation of a pig according to the invention. Also, when in operation inside a pipeline, a shroud element of this kind is able to prevent that parts of the drive element come into contact with the pipeline wall, for example, and thus may damage it. Particularly preferred is the arrangement of a guide disk on the shroud element. Guide disks of this kind are used on conventional pigs to position them inside the pipeline. In this instance the guide disk is in contact with the pipeline wall and has a diameter that is only marginally smaller than the internal diameter of the pipeline. If implemented as a flexible sealing element, the diameter of the guide disk may also be marginally larger than the internal diameter of the pipeline and is therefore in contact with the same during operation inside the pipeline. The arrangement of a corresponding guide disk on the shroud element is particularly advantageous if the fluid flowing in the pipeline is designed to flow around the pig body. In this instance it is not possible to attach a corresponding guide disk to the pig body directly since it would prevent the flow around the pig body.

A measuring plate is preferably disposed on the shroud element. A measuring plate is essentially a guide disk that is fitted with measuring equipment. Said measuring equipment measures in this instance forces or deformations of the disk as they occur when passing weld seams in the pipeline, for example. The internal diameter is typically reduced in the proximity of weld seams, which causes a deformation of the respective guide disk.

Particularly preferred is an arrangement where two guide disks and/or measuring plates are disposed on the shroud element, spaced apart from each other. This improves the guidance of the pig inside the pipeline. This can prevent in particular that the pig body comes into contact with the pipeline wall.

The pig is preferably provided with an exchangeable working unit, which at least contributes to the formation of the pig body, and through which the pig may be fitted with various sensors and/or actuators. It is therefore possible to prepare different working units with different sensors for the pig according to the invention. The sensors may, for example, be an ultrasound sensor and/or an EMAT sensor and/or a magnetic flow sensor. In addition, or instead of it, a working unit may also be provided with cleaning elements such as brushes, for example. An alternative working unit may be provided with a manipulator, for example in form of a robotic arm, with which repair work may be carried out. It is therefore possible to fit the same pig with different working units depending on the intended purpose. The working unit is preferably disposed at one end of the pig body so that it is easily accessible and exchangeable. It is particularly preferred to place the working unit at an end opposite the drive element. This makes the exchangeable working unit particularly easy to access and exchange. The exchangeable working unit is in this instance preferably provided with a streamlined shape of the pig body.

The pig is preferably provided with a sensor arrangement. With this sensor arrangement it is possible to check the pipeline for cracks, corrosion damage, deformations and/or other types of damage, for example. It is particularly preferred if the sensor arrangement is disposed on the exchangeable working unit.

The sensor arrangement comprises preferably a sensor for X-ray fluorescence analyses and/or an arrangement to carry out an atomic emission spectroscopy (AES), in particular a laser-induced breakdown spectroscopy (LIBS). The material composition of a pipeline wall can be determined through X-ray fluorescence analysis and/or AES. With a pig fitted with a sensor of this kind it is possible to subsequently make a determination concerning the material used for the pipeline. It can therefore be checked whether the respective sections of the pipeline were made from the correct material, or whether the correct materials were used for replacement or repair work on a pipeline. A sensor for X-ray fluorescence analysis and/or AES, in particular LIPS, cannot be used on conventional pipeline inspection pigs since the required measuring times are long compared to the usual inline measurements and the sensor must remain in the same location of the pipeline wall during the measuring process. A measurement of this kind can only be carried out with an extraordinary engineering effort with pigs that are moved through the pipeline. In contrast, a pig according to the invention is able to come to a stop repeatedly inside a pipeline relative to the pipeline wall and carry out such a measurement.

Since the X-ray fluorescent sensor and/or the arrangement for carrying out an atomic emission spectroscopy (AES) requires a clean surface, said sensor may be disposed in a sensor receptacle, which can be sealed against the pipeline wall with respect to the fluid flowing inside the pipeline. The fluid may preferably be evacuated from the sealable space in the sensor receptacle. Alternatively, the pig may be provided with two sealing elements spaced apart in longitudinal direction, which can be brought in contact with the pipeline wall and so create a sealed space together with said pipeline wall. The X-ray fluorescent sensor and/or the arrangement for carrying out an atomic emission spectroscopy (AES) may be located in this sealed space. Using two from each other separated sealing elements with a pig according to the invention may be made easier from an engineering point of view through a bypass.

When using the pig inside the pipeline, the locking means is preferably moveable in the direction of the pipeline wall. This makes it possible to disengage the locking means from the pipeline wall when the pig is transported by the fluid that flows in the pipeline. This reduces wear of the locking means during transport of the pig according to the invention in the pipeline. The locking means is only moved towards the pipeline wall once the pig has been sufficiently slowed down by the effect of the drive element, whereby said locking means comes into contact with said pipeline wall and decelerates the pig or locks it inside the pipeline. It is particularly preferred if the locking means is arranged in a hinged manner on the pig body. This facilitates a simple movement of the locking means to the pipeline wall. Particularly preferred is an arrangement where the locking means is hinged in the direction of the pipeline wall in a movement component acting against the flow direction of the fluid that flows in the pipeline. Through a suitable design the locking means may be made such that a force, which acts upon the pig due to the flowing fluid, leads to an amplification of the retaining forces of the locking means on the pipeline wall.

The pig is preferably provided with at least two locking means, which are disposed so that they apply a force in different directions upon the pipeline wall. In the instance of an even number of locking means, they are preferably arranged in pairs opposite each other with respect to the central longitudinal axis of the pig. This causes a uniform application of force at different locations of the pipeline wall. The pig is particularly securely retained inside the pipeline, and the danger of damage to the pipeline wall through the locking means is reduced.

The locking means may preferably be brought into contact with the pipeline by way of a gear spindle. Due to its elongated extension, a gear with a gear spindle may be easily fitted into a pig, which typically has also an elongated shape. This makes it possible to realize a simple and space-saving drive for the movement of a locking means. It is particularly preferred if the gear spindle is self-locking. Thus, it is not necessary to provide a brake or a further application of a force onto the locking means or onto the gear spindle to retain a locking means that has been brought in contact with the pipeline to hold it in said position.

A pig according to the invention is preferably provided with a positioning unit for positioning the pig inside a pipeline. Such a positioning unit may, for example, be provided with an odometer to record the distance travelled in the pipeline. Alternatively, or in addition, a positioning unit may be provided with weld seam detection to recognize circumferential weld seams. In particular with pipelines that are used in the oil and gas industry, the individual sections of a pipeline, and/or the circumferential weld seams that connect the individual sections, are documented. The circumferential weld seams that connect the individual sections of a pipeline may be recognized with the weld seam detection. A pig fitted with such a weld seam detection can use it to recognize and count the individual pipeline sections and so determine its own position in the pipeline. This is of particular interest if an inspection of each individual pipeline section is to be carried out. Thus, after detection of a circumferential weld seam, the pig is able to carry out one or more measurements. This ensures that every pipeline section is investigated. Alternatively, or in addition to it, the position determination unit may be provided with a receiver for externally transmitted positioning signals sent through the pipe wall. Such positioning signals may, for example, be signals from positioning transmitters attached to the outside of a pipeline, or a stop signal transmitted at a certain time. Through the positioning unit it is possible to determine the position at which a pig according to the invention has to stop, or at which point steps have to be initiated for its deceleration in the pipeline via the drive unit and the locking of it via the locking means.

The invention, furthermore, relates to the operation of a pig with a drive element inside a pipeline, whereby the pig is inserted into a pipeline, which is filled with flowing fluid, and is transported through the pipeline. Inside the pipeline the pig is moved, in particular decelerated, by a drive element of the pig which acts upon the flowing fluid. Because the drive element acts upon the flowing fluid, and in particular not via friction upon the inner pipeline wall, the pig is decelerated practically without wear, that is, without an additional wear caused by the braking process. Thus, it is possible to slow down a pig repeatedly multiple times inside a pipeline without causing additional wear on the pig and/or on the pipeline wall. This is particularly valuable for processes where the pig has to be decelerated in a pipeline at multiple locations.

The pig is preferably locked inside the pipeline. In the locked state, in which the pig does not move along the pipeline wall, but at least at a velocity that is less than the flow velocity of the fluid flowing in the pipeline, the drive element of the pig is moved by the flowing fluid, and the movement is converted into electrical energy. This provides electrical energy for the pig, which is extracted from the motion energy of the fluid flowing in the pipeline. Thus, the pig may be used for a longer period of time inside a pipeline than if the power were supplied from an on-board energy storage unit. Alternatively, a smaller and lighter pig may be used for the process, which further reduces possible wear on the pig or in the pipeline.

It is preferable for the pig inside the pipeline to stop relative to the pipeline to carry out maintenance and/or inspection work, in particular measurements of the material composition of the pipeline through X-ray fluorescence analysis and/or AES. With this method it is possible to carry out work as part of an inline inspection of a pipeline through a pig, where the pig must remain at a certain location inside the pipeline for a prolonged period of time. Where applicable, this may mean that work for which access from outside would normally be necessary, can be omitted.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual features of the exemplary embodiments described below may, in combination with the features of the independent claims, also lead to further developments according to the invention.

Figure 1:
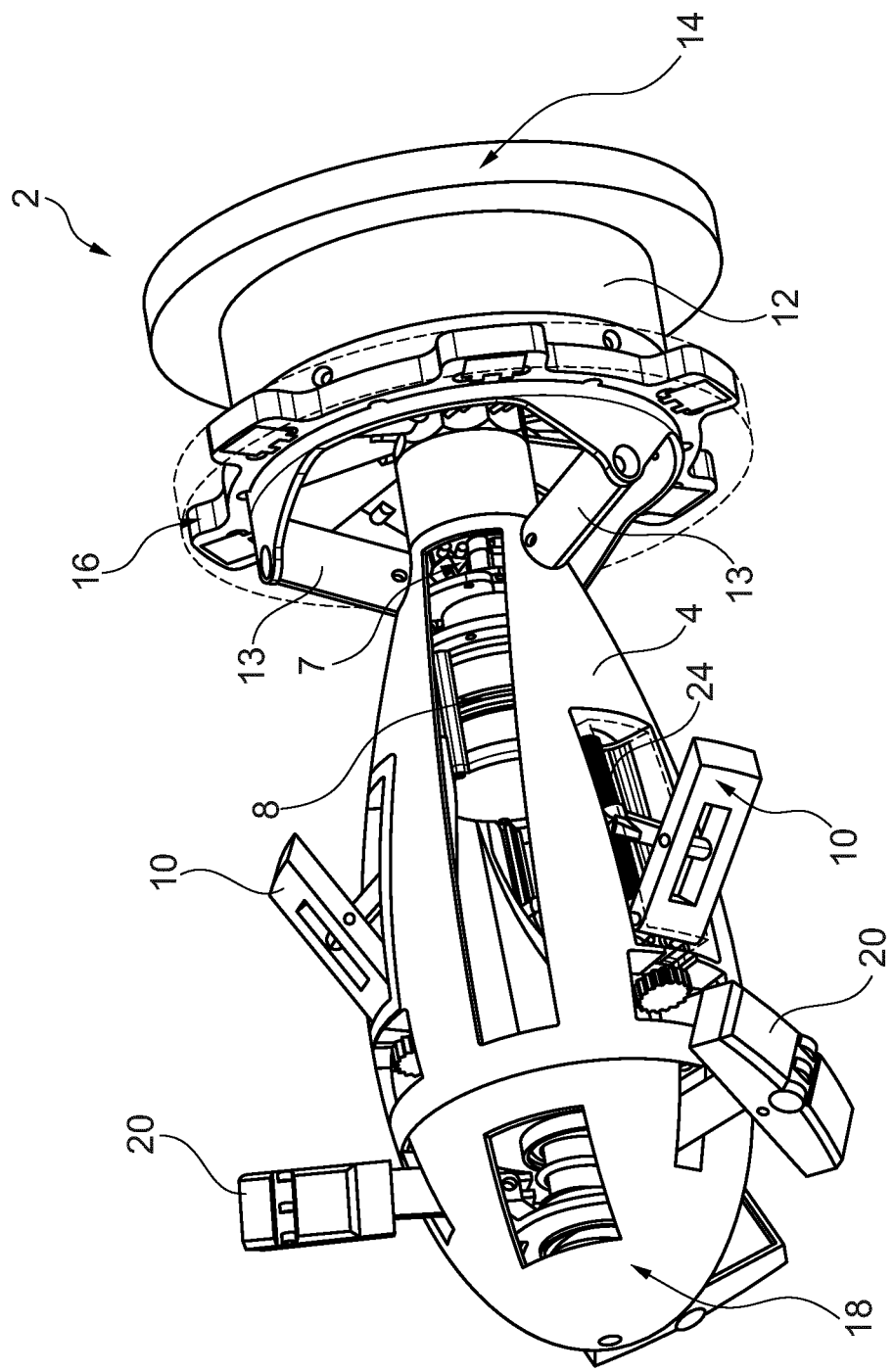
FIG. 1 is a pig according to the invention in isometric view at an angle from the front.

FIG. 1 depicts a pig 2 according to the invention comprising a pig body 4 with a drive element 6 attached thereto. The drive element 6 is surrounded by a shroud element 12 to which a guide disk 14 as well as a measuring plate 16 are attached. The drive element 6 is implemented as a twin propeller, which is connected to a generator unit 8 via a gear 7. At the end of pig body 4, which is located opposite the drive element 6, the pig body is provided with an exchangeable working unit 18. Attached to the working unit 18 is a sensor arrangement with three sensors, which are implemented in the exemplary embodiment of FIG. 1 as EMAT sensors. The pig body 4 is provided with locking means 10 that are designed as hinged elements. Said elements are hinged via levers that are moveable by means of a gear spindle 27. Said gear spindle 27 extends along the longitudinal extension of the pig body 4. This results in a space-saving arrangement of the locking means 10.

The pig body 4 is in this instance made rotationally symmetrical and drop-shaped, which gives it a streamlined shape. The pig body 4 has a smaller diameter than the inside diameter of a pipeline in which a pig 2 according to the invention is to be used. A fluid flowing in the pipeline is therefore able to flow past the pig body 4. This is made easier through the streamlined, drop-like shape of the pig body. The forces acting upon the pig by the flowing fluid are also reduced. The loads on the locking means 10 or, respectively, on the pipeline at the locations at which it is in contact with the locking means 10, are reduced.

In the present embodiment the drive element 6 is shown as a twin propeller. It is connected to the generator unit 8 via a gear 7. The generator unit 8 may also serve as a motor with which the drive element 6 is made to rotate. When using a twin propeller as drive element 6 it is possible to use the gear 7 to accurately compensate for the torsional moments that are introduced by each individual propeller. The orientation of the pig 2 inside the pipeline remains therefore constant. The forces to be absorbed by the locking means 10 are combined.

The shroud element 12 is connected to the pig body 4 via retaining elements. A guide disk 14 and a measuring plate 16 are attached to the shroud element 12. It is also possible to provide multiple guide disks 14 and/or multiple measuring plates 16. Although not absolutely necessary, it is advantageous to provide both a guide disk 14 and a measuring plate 16. In this instance a measuring plate 16 acts as a guide disk that is fitted with sensors. A deformation of the measuring plate is registered via the sensors. To this end the measuring plate has to make contact with the inside of a pipeline during operation of the pig and thus fix the pig body 4 inside the pipeline, seen in a cross-section of the pipeline. Thus, by means of the measuring plate 16 it is possible to detect deviations in the internal geometry of the pipeline, which may, for example, be caused by dents or bulges. A respective measuring plate 16 may therefore be part of a positioning unit for positioning the pig in the pipeline. Circumferential weld seams are recognized by the measuring plate. Weld seams of this kind join individual segments of the pipeline to each other. In particular with pipelines for the oil and gas industry, the individual segments, or the weld seams respectively with which the segments are joined, are documented for each pipeline. Due to weld seam recognition and through counting of the already passed weld seams it is therefore possible to determine the location of the pig inside the pipeline.

The pig according to the invention and as per FIG. 1 is transported by a fluid inside a pipeline. In order to slow down the pig, a generator unit, which acts as a motor, powers a drive element in a rotational direction that causes a deceleration of the pig 2 in the pipeline. Thus, the deceleration of the pig 2 inside the pipeline takes place almost without wear. As soon as the speed of the pig 2 relative to the pipeline is sufficiently low, preferably as soon as the pig 2 is stationary relative to the pipeline, the locking means 10 are brought into contact with the pipeline. The pig 2 according to the invention is jammed inside the pipeline. The rotational direction of the drive element 6 may then be reversed. The drive element 6 is now driven by the fluid that flows past the pig body and/or through said pig body. This motion energy is converted by the generator unit 8 into electrical energy with which a rechargeable energy storage unit may be charged, for example. This energy may also be used to operate the sensor arrangements. This is of particular interest for a sensor arrangement that comprises a sensor with very high power requirements such as an X-ray fluorescent sensor and/or an arrangement to carry out an AES. Since a pig 2 according to the invention remains in a certain position in the pipeline it is possible to also carry out time-consuming measurements. Alternatively, it is possible for the pig to carry out maintenance, cleaning or repair work in the pipeline from inside if it is fitted with suitable actuators.

Figure 2:
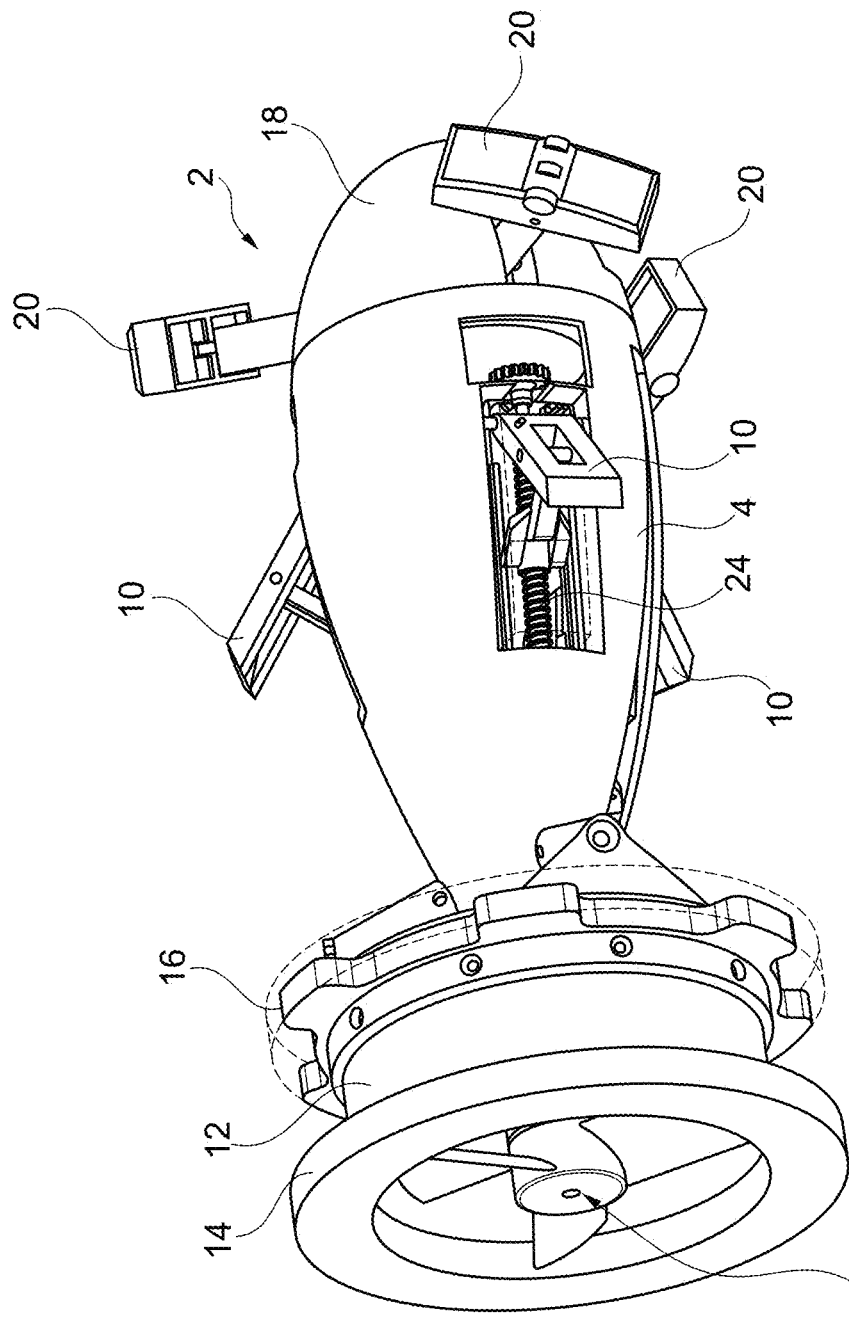
FIG. 2 shows the pig according to FIG. 1 in a view at an angle from the back.
Figure 3:
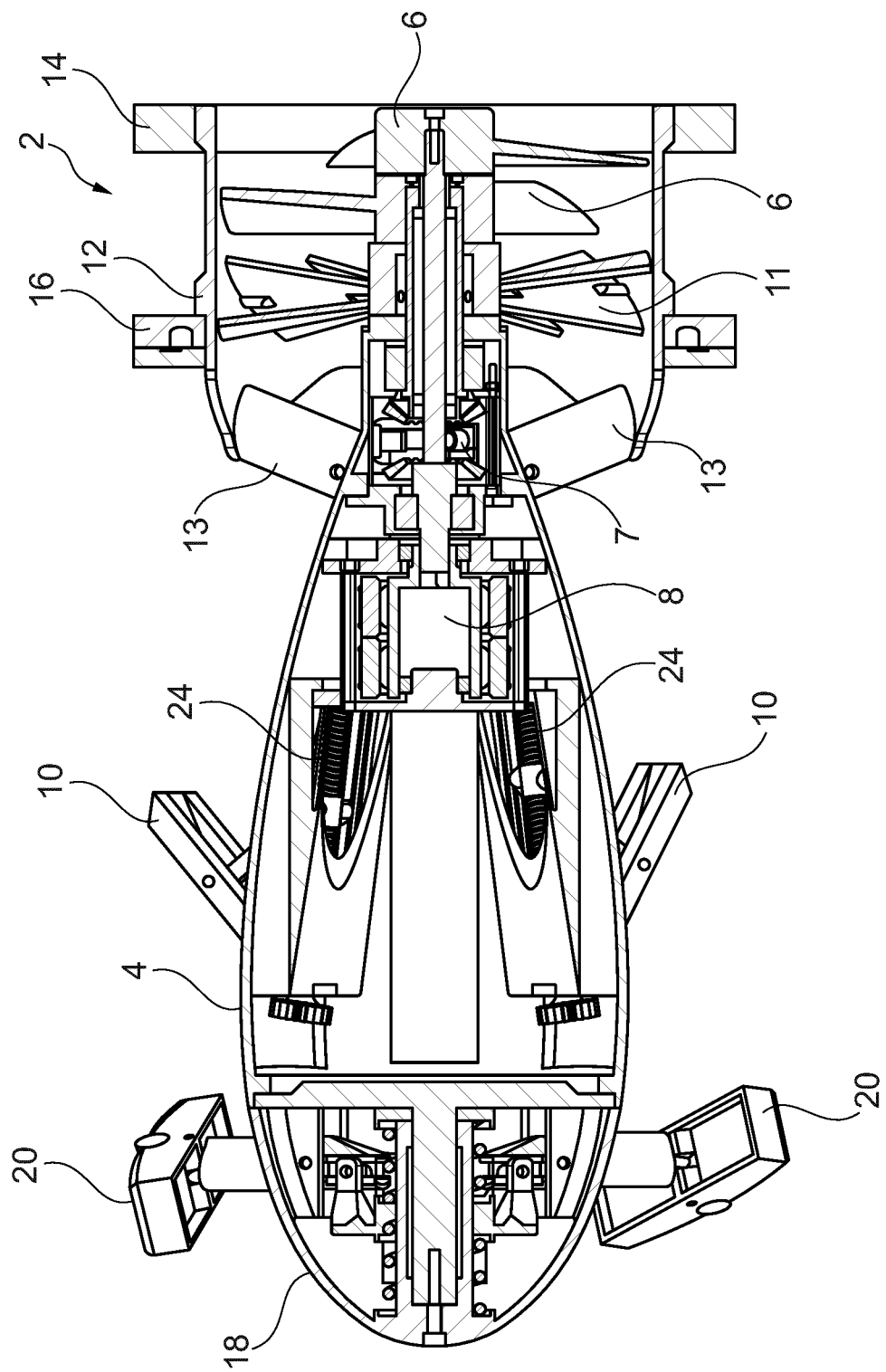
FIG. 3 is a cross-section through the pig according to FIG. 1.

FIG. 2 depicts once more the drive unit 6 with the propeller, which is surrounded by the shroud element 12. The guide disk 14 and the measuring plate 16 are disposed on the shroud element 12. The lever through which the locking means 10 is hinged, is also apparent. The lever is moved via a gear spindle 24. The gear spindle 24 is preferably made to be self-locking. In this embodiment the locking means 10 remains in a retracted position even if forces act upon the locking means 10. An additional brake is therefore not required, which reduces the complexity of the pig according to the invention. FIG. 3 depicts a cross-section through a pig 2 according to the invention. The split pig body 4 is apparent. The exchangeable working unit 18 is disposed on the side that is opposite to the drive element 6. The implementation with an exchangeable working unit 18 is optional, but it increases the flexibility of the pig 2. It is also conceivable to have a correspondingly fitted pig ready for every instance. The locking means 10 with the gear spindles 24 are also apparent in the cross-section. The gear spindles 24 extend in longitudinal direction of the pig. Nevertheless, they are not disposed in parallel to a longitudinal center axis of the pig. Following on from the motor [sic] unit 8, which also acts as a motor, is a gear 7 through which the motor unit 8 is connected with the drive element 6. When using a single propeller, a gear 7 of this kind becomes obsolete. The twin propeller is provided with two counter-rotating drive elements 6, which can be made to rotate by a fluid flow. They are connected via the gear 7 to the same generator unit 8. The gear 7 causes the propellers of the twin propeller to counter-rotate. The gear, furthermore, takes care of the automatic compensation of the torsional moments introduced into the pig by the individual propellers, so that the pig does not rotate around its longitudinal axis. The present embodiment shows guide vanes 11 disposed adjacent to the twin propeller. They are optional.

The shroud element 12, which surrounds the drive element 6, is attached to the pig body 4 via retaining elements 13. They also have a streamlined shape.

A vacant space is recognizable in the pig body 4, which is suitable to hold an energy storage unit, preferably a rechargeable energy storage, control electronics and/or a processing unit.

Figure 4:
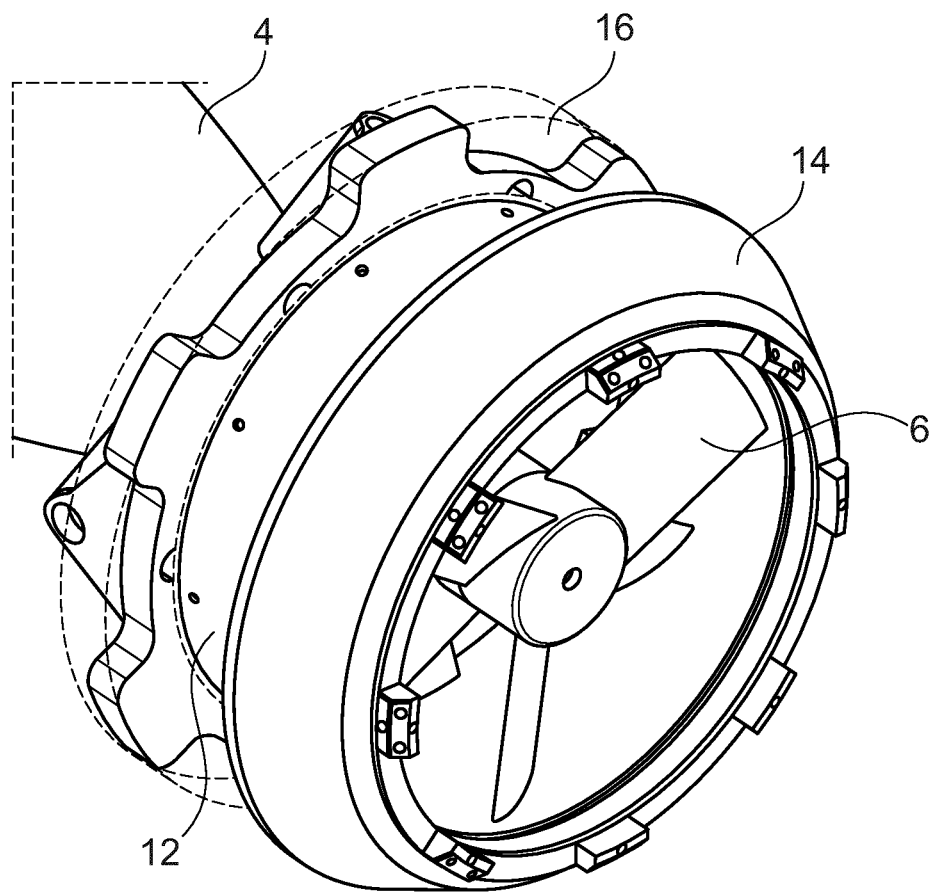
FIG. 4 is a section of a pig according to FIG. 1.

FIG. 4 depicts a section of a pig according to the invention in which a sealing cup is disposed on the shroud element, adjacent to the measuring plate 16, instead of a guide disk 14. Said sealing cup corresponds functionally to the guide disk 14 but is shaped a little differently. Also shown are sensors, which are forward-looking sensors that monitor the pipeline wall in front of the pig 2.

Figure 5:
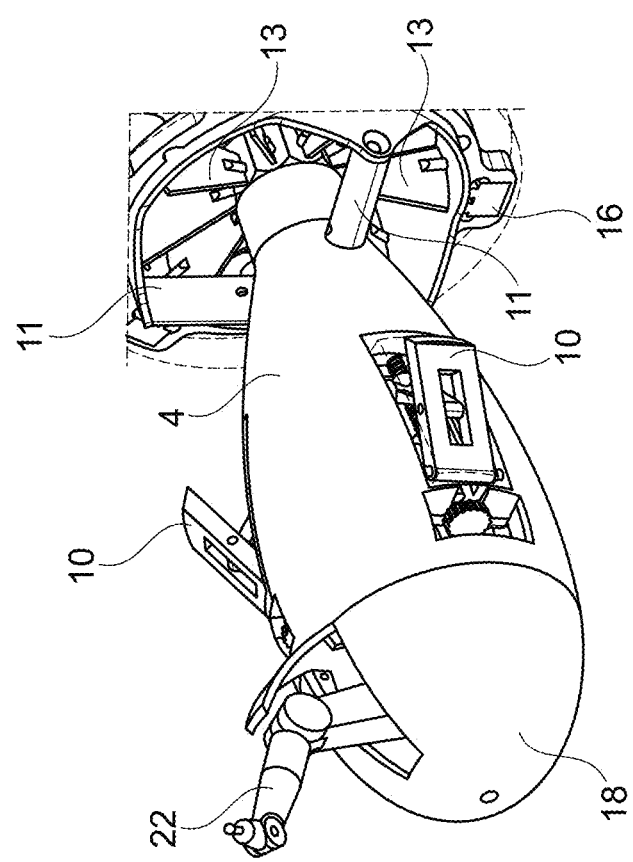
FIG. 5 shows a pig according to the invention with a working unit comprising a manipulator.

FIG. 5 depicts a pig with a different working unit 18. This working unit 18 is provided with a manipulator 22. A pig of this kind may, for example, be used to carry out maintenance or repair work in a pipeline. This makes it possible to carry out smaller maintenance or repair work without the need to make the pipeline accessible from outside and having to open it up. It may even be possible to carry out the work whilst the fluid keeps flowing through the pipe. This reduces the cost for maintenance and repair work significantly.

Figure 7:
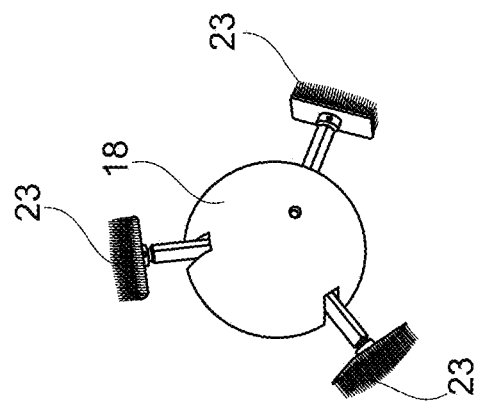
FIG. 7 shows an exchangeable working unit for use with a pig according to the invention with cleaning elements.
Figure 6:
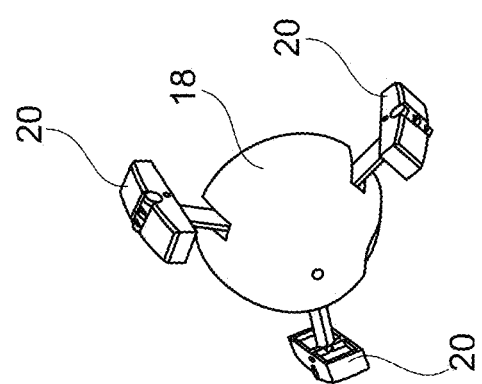
FIG. 6 shows an exchangeable working unit for use with a pig according to the invention with sensor arrangements.

FIGS. 6 and 7 depict two further alternative exemplary embodiments of working units 18. FIG. 6 shows the working unit 18 of a sensor arrangement 20 in form of EMAT sensors. The working unit 18 shown in FIG. 7 is fitted with cleaning elements in form of brushes 23. A pig fitted with this arrangement may be used for cleaning a pipeline.

The invention claimed is:

1. A pig for use in pipelines filled with a flowing fluid, the pig comprising:
    a pig body,
    a drive element, which can be set in rotation by the flowing fluid, disposed on said pig body,
    a generator unit connected to the drive element, through which a movement of the drive element may be converted into electrical energy, and
    a locking means through which a position and/or a speed of the pig inside a pipeline may be fixed,
    wherein the generator unit is located inside the pig body and is also operable as a motor through which the drive element may be made to rotate and which sets the speed for the pig that is different from the flow velocity of the flowing fluid inside the pipeline,
    wherein the pig is provided with an energy storage unit for electrical energy, which is connected to the generator unit, and
    wherein the drive element is disposed outside the pig body such that the drive element can be set in rotation by the fluid flowing past the outside of the pig body.

2. The pig according to claim 1, wherein cross-sectional areas extending transverse to a longitudinal center axis of the pig body are smaller at the respective ends of the pig body than at least one cross-sectional area in a section of the pig body located between the ends.

3. The pig according to claim 1, wherein the drive element is disposed at one end of the pig body.

4. The pig according to claim 1, wherein the drive element is a first drive element, and wherein the pig is provided with a second drive element that can be made to rotate, whereby the first drive element and the second drive element are designed to turn in opposite directions.

5. The pig according to claim 4, wherein the pig is provided with a counter-rotating twin propeller comprising the first drive element and the second drive element.

6. The pig according to claim 1, wherein the drive element is surrounded by a shroud element.

7. The pig according to claim 6, wherein a guide disk is disposed on the shroud element.

8. The pig according to claim 6, wherein a measuring plate is disposed on the shroud element.

9. The pig according to claim 1, wherein the pig is provided with an exchangeable working unit, which at least contributes to the formation of the pig body, and through which the pig may be fitted with various sensors and/or actuators.

10. The pig according to claim 9, wherein a sensor arrangement is disposed on the exchangeable working unit.

11. The pig according to claim 1, wherein the pig comprises a sensor arrangement.

12. The pig according to claim 11, wherein the sensor arrangement is disposed on an exchangeable working unit.

13. The pig according to claim 11, wherein the sensor arrangement comprises a sensor for X-ray fluorescence analyses and/or an arrangement to carry out an atomic emission spectroscopy (AES).

14. The pig according to claim 1, wherein the locking means is moveable in the direction of the pipeline wall during use of the pig inside the pipeline.

15. The pig according to claim 1, wherein the locking means is arranged in a hinged manner on the pig body.

16. The pig according to claim 1, wherein the pig is provided with at least two locking means, which are disposed so that they apply a force in different directions upon the pipeline wall.

17. The pig according to claim 1, wherein the pig is provided with a gear spindle through which the locking means can be brought into contact with the pipeline.

18. The pig according to claim 17, wherein the gear spindle is self-locking.

19. The pig according to claim 1, wherein the pig is provided with a positioning unit for positioning the pig in a pipeline.

* * * * *